Figure 5:
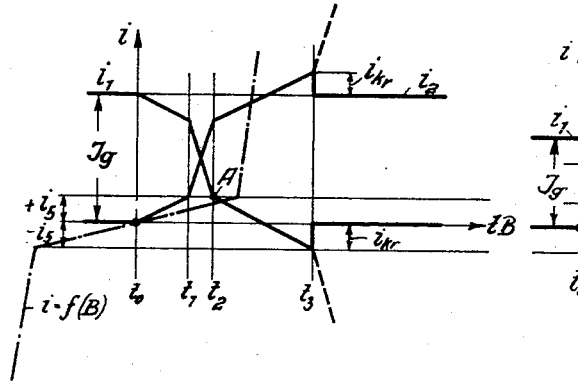

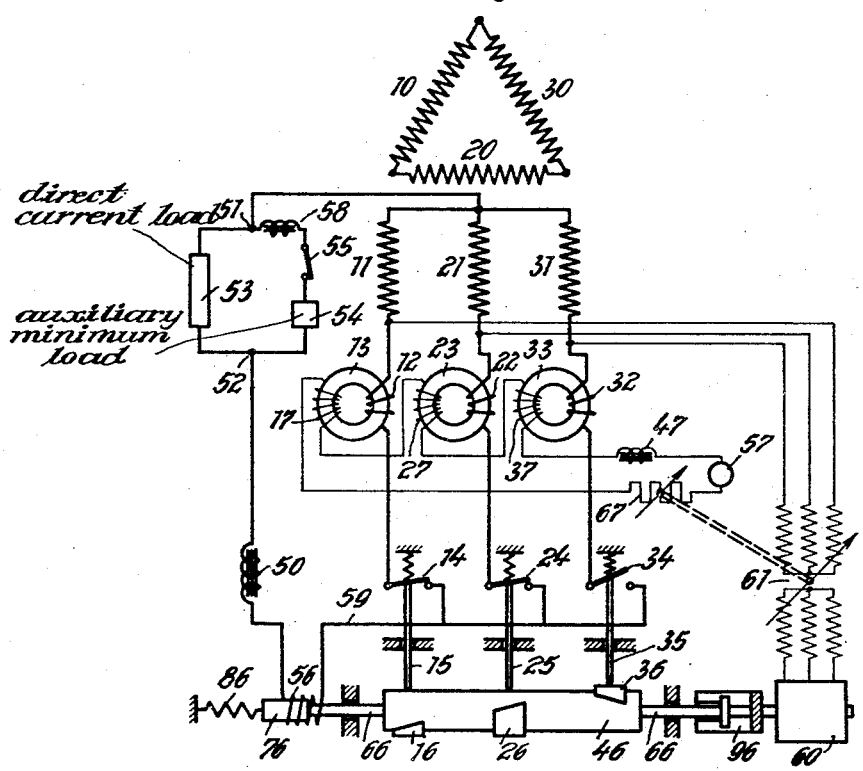

Nov. 28, 1939.                E. ROLF                 2,181,152
                MULTIPHASE CURRENT CONVERTING SYSTEM
                  Filed Feb. 12, 1937      3 Sheets-Sheet 2
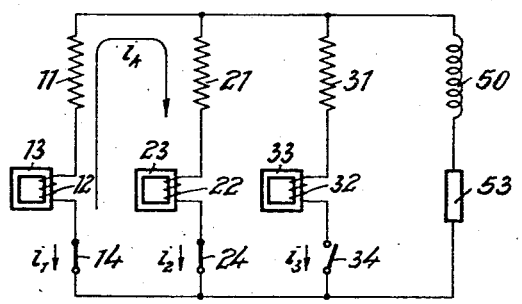
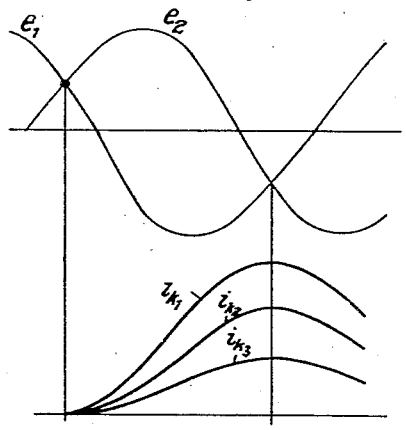
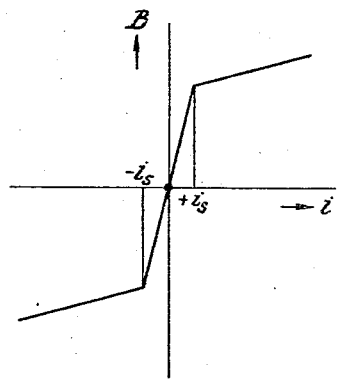
Inventor
Erick Rolf
by Knight Bros
    Attorneys Nov. 28, 1939.  E. ROLF  2,181,152
MULTIPHASE CURRENT CONVERTING SYSTEM
Filed Feb. 12, 1937  3 Sheets-Sheet 3

Inventor
Erich Rolf
by Knight Bros
attorneys

Patented Nov. 28, 1939

2,181,152

UNITED STATES PATENT OFFICE 2,181,152

MULTIPHASE CURRENT CONVERTING SYSTEM

Erich Rolf, Berlin-Siemensstadt, Germany, assignor to Siemens-Schuckertwerke Aktiengesellschaft, Berlin-Siemensstadt, Germany, a corporation of Germany Application February 12, 1937, Serial No. 125,363
In Germany March 10, 1936

10 Claims. (Cl. 175—365)

My invention relates to apparatus for periodically interrupting currents, for rectifying alternating currents or for converting alternating current of one frequency into alternating current of a different frequency, said apparatus operating with periodically actuated break contacts and in which inductors those inductance suddenly increases when the current intensity lies below a certain value are connected in series with said break contacts. In such devices the current intensity in the contact to be opened is so considerably reduced by the inductors that any formation of sparks is suppressed. The increase in inductance is attained by saturating the magnet body of the inductors already at low current intensities. If this current intensity is below a predetermined value the inductance is considerably increased so that the current curve is greatly flattened within the range of small intensities of current.

Tests have shown that in such apparatus the phenomena occurring during the commutation period, that is during the time when the current transport passes from the circuit breaker in one phase of the alternating circuit to a circuit breaker in another phase, depend upon the load conditions in such a degree that it may be extremely difficult to timely adjust the periodical opening and closing operations of the circuit breakers with respect to the cycle of th alternating voltage so as to ensure a proper flow of current at all the different loads.

The object of my invention is to remove these difficulties. More specifically the object of my invention consists in ensuring a reliable commutation process even in case of varying load conditions.

According to the invention the time interval between the opening moment of the synchronously driven contacts of the circuit breaking device and the moment at which owing to the desaturation of the above-mentioned inductors a flattening of the current curve occurs, is influenced in accordance with the magnitude of the load of the circuit breaking device in such a manner that the contracts are opened within the time interval during which at least one inductor, which is series connected with the contact to be opened, is desaturated and the intensity of current remains below a critical value.

Further details of the invention will be apparent from the following description taken in connection with the drawings.

Fig. 1 shows a converter according to the invention and illustrates the mechanical part of the converter as well as its wiring diagram. Fig. 2 shows a circuit portion of the converter shown in Fig. 1 for the purpose of explaining the operation of the converting system. Fig. 3 illustrates the variations of the voltage and the current in the circuit portion of Fig. 2. Fig. 4 illustrates the magnetization curve of one of the inductors in the arrangement according to Figs. 1 and 2. Figs. 5 to 10 show graphs illustrating the operation of the apparatus in different phases.

Since the function of the converting system of Fig. 1 is particularly easily understood if the converting apparatus operates as a rectifier, this example of using the converter will hereinafter be described.

Referring to Fig. 1, 10, 20 and 30 denote the primary windings of a main transformer assumed to receive energy from a power line not shown here. To the secondary windings 11, 21, 31 are connected the windings 12, 22, 32 of the inductors whose magnet bodies are designated by the numerals 13, 23, 33.

Circuit breakers 14, 24, 34 are series connected to the inductors. Each circuit breaker is provided with a spring which has the tendency to close the break contact. The contacts are broken by tappets 15, 25, 35 actuated by means of cams 16, 26, 36 arranged on a cylinder 46 whose shaft 66 is driven through a coupling 96 by a synchronous motor 60. The coupling 96 is so designed that it permits an axial displacement of the shaft 66. The cams 16, 26, 36 are so shaped that by the axial displacement of the shaft 66 the moments at which the tappets 15, 25, 35 are raised as well as the moments at which the tappets are again lowered may be varied. The shaft 66 is connected to a magnetic device which brings about such axial displacement of the shaft. The magnetic device is schematically shown in the drawings in the form of a movable magnet core 76, a winding 56 and a spring 86. The spring 86 has the tendency to pull the shaft 66 to the left. By means of the winding 56 the shaft may be, however, moved more or less to the right in accordance with the intensity of the current flowing through the winding. In this manner the moments at which a switching in or out takes place are shifted with respect to the position of phase of the motor 60.

The motor 60 is connected to the secondary winding 11, 21, 31 of the main transformer through a regulating transformer 61.

One of the contacts of each circuit breaker 14, 24, 34 is connected to a conductor 59. In the circuit of this conductor 59 is provided an inductance coil 50 besides the above-mentioned winding 56. Furthermore, the circuit comprises the terminals 51 and 52 for connecting the load 53. The terminal 51 is connected through the conductor 69 to the neutral point of the windings 11, 21, 31. To the terminals 51 and 52 is further connected an auxiliary circuit including an auxiliary load 54 which prevents the load of the direct-current circuit from falling below a certain minimum value. Furthermore, the auxiliary circuit may contain an inductance coil 58 as well as a switch or relay 55 by which the auxiliary load is disconnected if another load 53 is connected to the output terminals 51 and 52 of the direct-current circuit.

The inductances are so designed that its magnet cores are already saturated at a low current intensity lying below the mean or effective current intensity of the alternating current to be rectified. In this case it is preferable to make the magnet bodies of a material whose magnetization curve presents a sharp saturation bent.

The saturation of the reactors may upon exceeding a certain current intensity be further attained by the use of a magnetic bias, as is provided in the arrangement shown in Fig. 1. The magnet bodies 13, 23, 33 of the reactors are provided each with an exciting winding 17, 27, 37 adapted to bring about a magnetic bias. The exciting windings are series connected to a power source through a smoothening inductor 47 and a variable resistance 67.

The moment at which the contacts are broken in the arrangement shown, is adjusted by the longitudinal displacement of the shaft 66 and this shaft is displaced in accordance with the load current flowing through the winding 56 and taken from the terminals 51 and 52. A further method of control may be brought about by adjusting the regulating transformer 61 and thereby shifting the moments at which the contacts are broken with respect to the period of the alternating current to be rectified. A third method of control consists in varying the time at which the inductance of the reactors suddenly increases, also with respect to the period of the alternating current by varying the resistance 67. As indicated by the dash lines between the transformer 61 and the resistance 67 both members may in many cases be adjusted simultaneously, for instance with the aid of a hand wheel, according to the main operating conditions. The winding 56 serves to effect an additional automatic control.

The operation of the arrangement is as follows. Each circuit breaker is periodically closed and opened so as to allow a flow of the current in its phase mainly in one direction. By these means the alternating current is converted into a direct current flowing between line 59 and the neutral point of transformer 11, 21, 31. The magnetic bias of the three inductors 13, 23 and 33, and the phase position of the synchronous motor 60 are so adjusted that the opening moments of each breaker 14, 24, 34 lie within the period in which the inductance of the respective inductors is increased and, thereby, the current is maintained below a critical value for a certain period during which the commutation takes place. In the case of load fluctuations, the winding 56 effects a change of the phase position of the breaker operations with respect to that of the synchronous motor so as to automatically maintain the most favorable time adjustment between the weak current period and the contact opening operation.

Further details of the operation of the rectifying arrangement are hereinafter more fully described by reference to the detail circuit shown in Fig. 2. This circuit is a partial reproduction of Fig. 1 and comprises only those elements necessary for a better understanding of the invention.

In Fig. 2, 11, 21, 31 denote the secondary windings of the main transformer; 12, 13; 22, 23 and 32, 33 the inductors, 14, 24, 34 the circuit breakers. 50 is the inductance coil in the direct-current circuit and 53 the load of the direct-current circuit. The contacts in Fig. 2 are shown in a position as regards time which corresponds to Fig. 1, that is to say, the contacts 14 and 24 are closed, whereas the contact 34 is open. It will be apparent that during the time within which both contacts 14 and 24 are simultaneously closed a circuit 11, 21, 22, 24, 14, 12, 11 is established. In this path of short-circuit current $i_k$ the difference between the voltages of the phase 11 and the phase 21 is effective as a motive force.

Fig. 3 is a graphical representation of the variations of phase voltages $e_1$ and $e_2$ in the windings 11 and 21 and Fig. 4 is a graphical representation of the magnetization current flowing in the circuit shown in Fig. 2. For the sake of simplicity it is assumed that the closure of the following contact is effected exactly at the moment at which $e_1$ is esual to $e_2$. The voltage effective in the circuit in which the short-circuit current flows is then always equal to the difference between $e_2$ and $e_1$. The variations of the short-circuit current $i_k$ which is created by the resultant voltage are determined by the magnitude of the inductances in the path of the short-circuit current, therefore, by the stray inductances of the transformer windings 11, 12, 13 and the inductances of the reactors connected in series with the contacts 14, 24, 34.

Since the difference between $e_2$ and $e_1$ varies sinusoidally also the short-circuit current if the inductances are assumed to be constant must vary sinusoidally. The short-circuit current which adjusts itself will be in this case the greater, the smaller the total inductance in the circuit. In the lower portion of Fig. 3 are graphically represented the variations of the short-circuit current for three different constant magnitudes of the total inductance. $i_{k1}$ represents, for instance, the short-circuit current when both inductors 12, 22 lying in the circuit are saturated so that the total inductance of the circuit is composed of the stray inductances of the transformer windings and of the air inductances (inductance in the state of saturation) of both inductors. $i_{k2}$ represents the short-circuit current which adjusts itself when one of the two inductors is desaturated, whereas $i_{k3}$ represents the short-circuit current when both inductors are desaturated.

It is assumed that the magnetic behavior of the inductors be such that there is practically no saturation below a given current value but that the saturation suddenly increases to its maximum value when this current value is exceeded. Above the saturation current value only the air inductance of the reactors is, therefore, effective. The simplified characteristic curve of magnetization of such an inductor is shown in Fig. 4. Up to the saturation value $i_s$ the magnetic induction B increases steeply with increasing magnetizing current and as soon as the limit $i_s$ is exceeded it continues to vary according to the characteristic curve of magnetization for air. If the ratio of the permeability of the magnetic core—in the case of magnetizing currents below $i_s$, which which permeability is assumed to be constant—to the permeability of air designated by $\mu$, the coefficient of self-induction of the inductor within the range $-i_s$ to $+i_s$ is approximately $\mu$ times as great as outside of this range. If the magnetizing current falls below the value $i_s$ the inductance increases abruptly to approximately $\mu$ times its value.

With reference to the following figures it will now be explained how the current varies in the alternately operated contacts, if the load of the converting apparatus is variable, that is in the case under consideration the magnitude of the direct current flowing in the current consuming device. It is assumed in this case that the saturation current for the inductors $i_s$ owing to their proper dimensioning is equal to the critical current $i_{kr}$ which may be interrupted by the break contacts without there occurring a detrimental formation of sparks. It is further assumed that the following contact always closes at the moment at which the voltages coincide with each other and that the rectified current is completely smooth. The last-mentioned assumption entails that at every moment the sum of the currents in both simultaneously closed contacts must be always equal to the direct current flowing in the current consuming device, that is to say at every moment $i_1+i_2=I_g$. In Figs. 5 to 10, the currents $i_1$ and $i_2$ in both alternately operated contacts 14, 24 are plotted as ordinates and the time $t$ and the magnetic induction in the inductors B are plotted as abscissas. For the sake of simplicity, the portions of the current curves are not given a sine shape as it should strictly be the case but the current curves are formed of straight lines.

Fig. 5 shows the conditions for a relatively large load current $I_g$. Before the time $t_0$, that is before the commutation begins, only the contact 14 carries the total direct current $I_g$. Up to this moment, $i_1$ is, therefore, equal to $I_g$. Since $I_g$ is considerably greater than the value of the saturation current $i_s$ which results from the magnetization curve of the inductors shown in Fig. 5 as dot and dash line, the inductor 12 series connected to the contact 14 is saturated, that is it possesses only its small inductance. As soon as the contact 24 is also closed at the time $t_0$ a circuit is thereby established in which a short-circuit current is created which is in opposition to the current in the contact 14. The contact 24 carries only this short-circuit current. With increasing short-circuit current in the contact 24, the current $i_1$ in the contact 14 decreases accordingly. Since the short-circuit current originates only at zero voltage, the coil 22 in series with the contact 24 is still unsaturated; a saturated and an unsaturated inductor are, therefore, arranged in series in the circuit in which flows the short-circuit current. The current would, therefore, increase according to the mean curve $i_{k2}$ shown in Fig. 3. At the time $t_1$ the current $i_2$ exceeds the saturation value and the inductor 22 connected in series with the contact 24 suddenly diminishes its inductance so that both coils are now saturated and the current varies according to the steepest curve in Fig. 3. The current $i_2$, therefore, increases rapidly. Accordingly, the current $i_1$ decreases also rapidly and attains its saturation value at the time $t_2$. The inductor 12 series connected with the contact 14 is now desaturated so that an unsaturated and a saturated inductor are again in series. Consequently, the current again increases gradually until the current $i_1$ exceeds the negative value of the saturation current and the current then varies again in accordance to the steepest curve as shown by the dash line.

Provided that the saturation value be equal to the critical current value, $t_3$ is, therefore, the last moment at which a breaking of the contact 14 is possible without sparking. The opening of the contact 14 must, therefore, take place within the time interval $t_2$—$t_3$.

Figure 6:
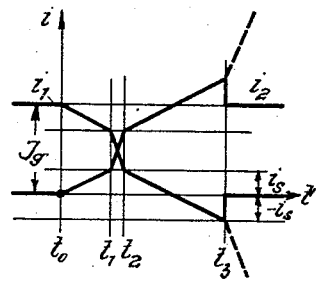

Fig. 6 shows the commutation at a somewhat lower load current $I_g$ which, however, still lies above the saturation value $i_s$. As will be seen from Fig. 6, the time interval $t_1$—$t_2$ within which the commutation varies according to the steepest curve is considerably reduced. Accordingly, the time $t_3$ at which the contacts must be at the latest broken lies closer to $t_0$.

Figure 7:
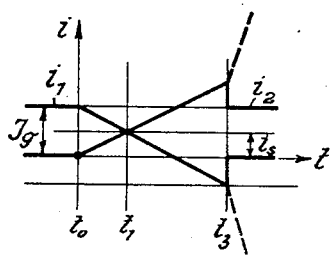

Fig. 7 finally shows the case in which $I_g$ is equal to double the value of the saturation value $i_s$. The rapid increase in current present in the above-mentioned cases in the middle of the commutation has now completely disappeared, since at the moment at which $i_2$ exceeds the saturation value, $i_1$ decreases below the saturation value so that in the time interval $t_0$—$t_3$ either inductor is always unsaturated. The current curve presents, therefore, always the mean steepness.

Figure 8:
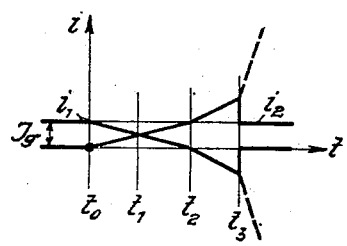

In Fig. 8, $I_g$ is equal to $i_s$. Immediately at the beginning of the commutation at point $t_0$, $i_1$ falls below the saturation value, while $i_2$ still lies also below the saturation value. In this case both inductors are, therefore, simultaneously in an unsaturated state and the current curve increases gradually until at the time $t_2$, the current $i_2$ exceeds the saturation value. The current curve then varies with mean steepness until also $i_1$ exceeds the saturation value in the negative direction and, therefore, the current curve assumes the greatest steepness.

Figure 9:
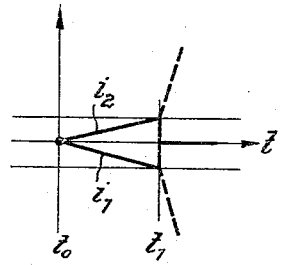

Fig. 9 shows the commutation at no load, that is when the current $I_g$ is zero. Consequently, only the short-circuit current flows in both contacts, that is in one contact in the positive direction and in the other in negative direction. At the moment $t_1$ both currents exceed the saturation value simultaneously so that the steepness of the current curve at this point suddenly increases from the smallest to the greatest value.

Consequently, at no load the contact must be broken in the time interval $t_0$—$t_1$. If the critical current value does not coincide with that of the saturation current, the time interval during which the breaking of the contacts is possible is shifted and the duration thereof is varied. If, for instance, the critical value is smaller than the saturation value, the time interval within which the contacts must be broken is considerably reduced.

From the above considerations it will be apparent that difficulties are encountered in the sparkless flow of current owing to the shifting of the current curve during the commutation period at varying load if the moments at which the breaking of the contacts takes place are fixed with respect to the alternating-voltage curve. If, however, the relative position of the points at which the breaking takes place and of the portions of the current curve which become flattened owing to the desaturation of the inductors is influenced in such a manner that the breaking of the contacts always falls within a time interval during which at least one of the inductors is desaturated and the current in the contact to be broken lies below the critical value a perfect commutation is ensured at all loads.

In carrying out the method according to the invention there are a number of possibilities. Thus, for instance, the moment at which the breaking of the contacts takes place referred to the cycle of the flow of current may be shifted with varying load. Under circumstances, it may be advantageous in this case if the moment at which the contacts are broken and the moment at which the contacts are closed are shifted simultaneously. Depending upon the difference between the two phase voltages at the moment at which the contacts are closed a steeper or flatter inclination of the curve of the voltage effective in the circuit in which the short-circuit current flows, is attained.

The simplest conditions are present by simultaneously varying the moment at which the switching in and the moment at which the switching out takes place if the duration of the overlapping is kept constant, i. e., if both moments are shifted in the same direction by the same amount. Various methods have been proposed for shifting the moments at which the breaking of the contacts takes place. Here the shifting of the fixed contacts and the use of a synchronous driving motor provided with several exciting windings in different axes may, for instance, be mentioned. All these shiftings of the moments at which the contacts are broken are rather sluggish and are, therefore, as a rule, used to advantage only in cases in which the fluctuations of load take place comparatively slowly. If the inductors are dimensioned in such a manner that the time interval during which the current to be interrupted varies gradually, that is to say, for instance, the interval $t_2$—$t_3$ in Figs. 5 and 6 is comparatively long, it is possible to obtain within certain load limits a proper commutation without effecting any load-responsive influence of the commutation. These load limits are attained on the condition that the fixed moment at which the contacts are broken must still lie within the time interval $t_2$—$t_3$ provided that the critical current value is not smaller than the saturation value.

If it is desired to cause the contacts to be always broken at an intensity of current below the critical value from no load up to a certain load value without appreciably influencing the commutation the greatest possible load is obtained on the condition that at load the current to be interrupted at the moment at which the breaking takes place must at least be reduced to the critical value and that at no load the breaking of the contacts may be effected at the latest at the moment at which the current to be interrupted attains the critical value. If these conditions are considered, for instance, with reference to Fig. 5 in the case of load and to Fig. 9 in the case of no load this means that the point A in Fig. 5 must lie as regards time before the point $t_1$ in Fig. 9.

In many cases it may happen that these favorable conditions cannot be obtained or are not practical for other reasons. The point A will, therefore, often lie behind the point $t_1$ at no load. It is, however, possible to obtain an artificial overlapping of the flat current curve portions at no load and at load by imparting a preliminary load to the converting apparatus at no load, i. e., if, for instance, in the case of a rectifier upon the reduction of the load below a certain value, an auxiliary load circuit is connected to the direct-current terminals. In Fig. 1 is shown such an auxiliary circuit. The auxiliary load is denoted by the numeral 54. At loads at which a retardation of the flat current portion is no longer necessary, the auxiliary load is preferably disconnected in order not to unnecessarily affect the efficiency of the system. To this end, a switch or relay 55 is provided as shown in Fig. 1. A comparison between Figs. 8 and 9 shows that with a comparatively small preliminary load—in Fig. 8 the preliminary load current is equal to the saturation current—a considerable lengthening of the flat current curve may under certain circumstances be attained. Even if it is not possible in all cases with only one step of the preliminary load to cause the moment, at which the contacts at no load must be broken at the latest, to be retarded with respect to the moment a which the contacts may be at the earliest broken at full load, it is nevertheless possible to considerably simplify the auxiliary means for the load-responsive influence of the commutation by applying a preliminary load.

In the preliminary load circuit, smoothening means, for instance the reactor 56 (Fig. 1), are preferably provided, since the above-mentioned conditions may under certain circumstances be again affected by a ripple preliminary load current. In order that the preliminary load current which has generally only a fixed value with regard to the magnitude of the saturating current and of the critical current is not varied by the fluctuations of the voltage supplied by the converting apparatus, a constant loading resistance (54 in Fig. 1) is employed advantageously as an auxiliary current consuming device. As a constant loading resistance an iron-hydrogen resistance may, for instance, be employed or a direct-current motor may be provided for this purpose which has a constant torque, for instance, its own moment of friction.

Figure 10:
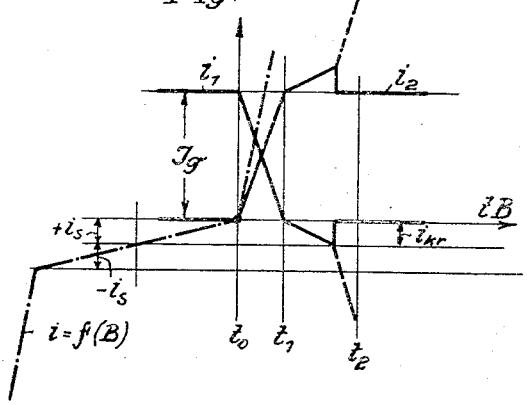

Another possibility of carrying out the method according to the invention consists in providing the inductors connected in series with the breaking contacts as shown in Fig. 1 with biasing windings which are fed with variable magnetization current in accordance with the load of the converting apparatus. How the flow of current varies by a magnetic bias of the inductors at a certain load is shown in Figs. 5 and 10. In Fig. 5, the ideal magnetization curve of the inductors is represented by a dash and dot line. The current is plotted as ordinate and the magnetic induction B as abscissa. Fig. 5 shows the case in which the inductor is not biased, i. e., the case in which the zero value of the magnetic induction coincides with zero value of the current flowing through the inductor and the corresponding contact, whereas in Fig. 10 it is assumed that the inductors are biased in such a manner that a negative current of the order of the saturation current must first flow through the inductor so as to reduce the magnetic induction in the core of the inductor to the zero value.

At the moment, at which the current $i_2$ in the following contact assumes in the case of such a magnetic bias even the smallest positive value, the inductor is already completely saturated and accordingly its inductance is small. Immediately after the moment at which the switching in takes place a time interval $t_0$—$t_1$, consequently, follows during which both inductors of the circuit in which the short-circuit current flows are saturated so that the current varies at a steep incline, till finally the current in the contact to be broken attains its zero value. Then the current in the contact to be opened drops below the zero value so that the inductor connected in series with the contact is desaturated. The current curve $i_1$ has a steepness corresponding to the presence of a saturated and an unsaturated inductor until the current $i_1$ increases to double the negative saturation current. Since in the instance under consideration it has, however, been assumed that the critical current value is equal to the saturation current, the breaking of the contacts must be effected at the latest at the moment $t_2$. A comparison of Figs. 5 and 10 shows a considerable shifting of the range proper within which the flow of current takes place and of the adjacent flat portion of the curve. By a positive magnetic bias the end point A of the time interval $t_1$—$t_2$ of the main portion of the curve may, for instance, be brought closer to the time $t_0$ of the coincidence of the phase voltages. In this manner a larger current may, on the one hand, be obtained for a given fixed moment at which the contacts are broken and on the other hand for a certain intensity of current, the moment at which the contacts are broken may be chosen sooner, thus reducing the value of the recurrent voltage, which enhances the reliability of operation as far as backfires are concerned. The lower the recurrent voltage, the greater the critical current value will be. From this point of view a further shifting of the moment at which the contacts are broken may, consequently, be also effected in accordance with the magnetic bias.

In some cases in which only small load fluctuations occur, it may be sufficient to maintain the magnetic bias adjusted at a fixed value. In many cases it is not absolutely necessary to vary the biasing current continuously with the load, but a greater load range may be controlled with the aid of a certain biasing current.

It is often preferable not to maintain the biasing current of the inductors constant over the entire period of the flow of current but to bias the inductors, for instance, only at certain moments of the cycle. This may be obtained, for instance, by producing a magnetic bias with the aid of an alternating current. As a rule, this alternating current must have a different position of phase in the inductors belonging to the different branches.

An additional improvement in the commutation may be obtained by "bending" the curve of the alternating voltage, i. e., by giving it a shape differing from the sine shape so that the voltage recurring at the broken contacts increases more slowly. To this end, the voltage curve must be flattened in the neighborhood of the point at which the contacts are broken. In practice, this may be effected in such a manner that higher harmonics, particularly of three-fold frequency, are superimposed in any suitable manner upon the alternating voltage. Arrangements according to the invention may be used for all kinds of converting purposes, for instance for converting alternating current into direct current or alternating current of another frequency.

I claim as my invention:

1. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, impedances designed to increase their apparent resistance abruptly at current values below a certain periodical low value so as to periodically flatten the curve of the current to be controlled by said breakers, said impedances being series connected with said breakers so as to form part of said periodically closed short circuits, load responsive means for shifting the moments of the closings and of the openings of said breakers with respect to the cycle of the alternating voltage, said means being designed to maintain the length of the closing period of said breakers constant and to delay said period at increasing load current intensities.

2. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, impedances designed to increase their apparent resistance abruptly at current values below a certain periodical low value so as to periodically flatten the curve of the current to be controlled by said breakers, said impedances being series connected with said breakers so as to form part of said periodically closed short circuits, load responsive means for varying the time interval between the periodical operation of said breakers and the beginning of said flattening of the current curve whereby the opening of each breaker is effected within an interval during which at least one of the impedances being series connected with said breaker in a common short circuit has an increased apparent resistance and the absolute value of the current to be interrupted is below a critical value, and means for preventing a lowering of the load current below a predetermined value.

3. With a mutliphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, impedances designed to increase their apparent resistance abruptly at current values below a certain periodical low value so as to periodically flatten the curve of the current to be controlled by said breakers, said impedances being series connected with said breakers so as to form part of said periodically closed short circuits, load responsive means for varying the time interval between the periodical operation of said breakers and the beginning of said flattening of the current curve whereby the opening of each breaker is effected within an interval during which at least one of the impedances being series connected with said breaker in a common short circuit has an increased apparent resistance and the absolute value of the current to be interrupted is below a critical value, an auxiliary load circuit, and a load responsive switching device for connecting said auxiliary load with said arrangement upon a decrease of the load current of said arrangement below a predetermined value, said auxiliary load circuit being so dimensioned that by connecting said auxiliary circuit the moment at which within the period of the alternating voltage said critical current value in the breaker to be opened is exceeded at no load is retarded with respect to the moment at which said critical value is exceeded for the first time at the maximum operating load.

4. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, inductances having a magnetic core designed to become abruptly desaturated and to thereby increase the inductivity at low periodical current values so as to periodically flatten the current to be controlled by said breakers, said inductances being series connected with said breakers so as to form part of said periodically closed short circuits, load responsive means for varying the time interval between the periodical operation of said breakers and the beginning of said flattening of the current curve whereby the opening of each breaker is effected within an interval during which at least one of the inductances being series connected with said breaker in a short circuit has an increased inductivity and the absolute value of the current to be interrupted is below a critical value, an additional circuit containing an auxiliary load and smoothening means, and load responsive means connected with said direct current circuit for connecting said additional circuit with said direct current circuit upon a decrease of the direct load current below a predetermined value.

5. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, impedances designed to increase their apparent resistance abruptly at current values below a certain periodical low value so as to periodically flatten the curve of the current to be controlled by said breakers, said impedances being series connected with said breakers so as to form part of said periodically closed short circuits, load responsive means for varying the time interval between the periodical operation of said breakers and the beginning of said flattening of the current curve whereby the opening of each breaker is effected within an interval during which at least one of the impedances being series connected with said breaker in a common short circuit has an increased apparent resistance and the absolute value of the current to be interrupted is below a critical value, an auxiliary load circuit containing as auxiliary load a variable resistor maintaining the current constant at varying voltage, and load responsive means for switching in said auxiliary circuit upon a decrease of the load current of said arrangement below a predetermined value.

6. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, impedances designed to increase their apparent resistance abruptly at current values below a certain periodical low value so as to periodically flatten the curve of the current to be controlled by said breakers, said impedances being series connected with said breakers so as to form part of said periodically closed short circuits, load responsive means for varying the time interval between the periodical operation of said breakers and the beginning of said flattening of the current curve whereby the opening of each breaker is effected within an interval during which at least one of the impedances being series connected with said breaker in a common short circuit has an increased apparent resistance and the absolute value of the current to be interrupted is below a critical value, an auxiliary load consisting of a direct current motor charged with a constant torque, and load responsive switching means for connecting said motor with said direct current circuit upon a decrease of the load current of said arrangement below a predetermined value.

7. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, inductances having a magnetic core designed to become abruptly desaturated and to thereby increase the inductivity at low periodical current values so as to periodically flatten the current to be controlled by said breakers, said inductances being series connected with said breakers so as to form part of said periodically closed short circuits, a preexciting winding arranged on the magnetic core of each of said inductances, a preexciting circuit connected with said windings, variable means disposed in said preexciting circuit for controlling the current flowing in said windings, means for adjusting the phase position of the opening moment of said breakers with respect to the cycle of said alternating current in dependency upon the magnitude of said preexciting current.

8. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, inductances having a magnetic core designed to become abruptly desaturated and to thereby increase the inductivity at low periodical current values so as to periodically flatten the current to be controlled by said breakers, said inductances being series connected with said breakers so as to form part of said periodically closed short circuits, load responsive means for adjusting the phase relation between the periodical operations of said breakers and said periods of increased inductivity, a preexciting winding arranged on the core of each of said inductances, a common energizing circuit connected with said windings, said circuit including variable controlling means for adjusting the magnitude of the energizing current, and phase shifting means forming part of said device for operating said breakers, said phase shifting means being designed to adjust the phase position of the operation of said breakers independent of said load responsive means, and an operative connection between said variable controlling means and said phase shifting means, said connection being designed to ensure a simultaneous and mutually adapted operation of said controlling and said shifting means.

9. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, inductive reactors having a magnetic core consisting of a ferromagnetic material the magnetization curve of which has a sharp saturation bend and being designed to become abruptly desaturated and to thereby increase the inductivity at low periodical current values so as to periodically flatten the curve of the current to be controlled by said breakers, said reactors being series connected with said breakers so as to form part of said periodically closed short circuits, a preexciting winding arranged on the magnetic core of each of said reactors, and circuit means connected with each of said windings for energizing said winding by an auxiliary current synchronous with that of said alternating current circuit and having a phase position different from that of the energizing currents in the other windings and from that of the current flowing in the reactor associated with said winding.

10. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with the frequency of said alternating current circuit, said device being designed to actuate said breakers in succession with overlapping closing periods, so that short circuits including the simultaneously closed breakers are closed periodically, inductive reactors having a magnetic core consisting of a ferromagnetic material the magnetization curve of which has a sharp saturation bend and being designed to become abruptly desaturated and to thereby increase the inductivity at low periodical current values so as to periodically flatten the curve of the current to be controlled by said breakers, said reactors being series connected with said breakers so as to form part of said periodically closed short circuits, a preexciting winding arranged on the magnetic core of each of said reactors, circuit means connected with each of said windings for energizing said winding by an auxiliary current synchronous with that of said alternating current circuit and having a phase position different from that of the energizing currents in the other windings and from that of the current flowing in the reactor associated with said winding, shifting means for varying the phase position of the operation of said breakers with respect to the cycle of the current to be interrupted, and means for varying the phase difference between said auxiliary current and the current flowing in the reactor in dependence upon the phase position of said breaker operation.

ERICH ROLF.